(12) United States Patent
Vinod et al.

(10) Patent No.: US 12,124,241 B2
(45) Date of Patent: Oct. 22, 2024

(54) SYSTEM AND METHOD FOR INDIRECT DATA-DRIVEN CONTROL UNDER CONSTRAINTS

(71) Applicant: Mitsubishi Electric Research Laboratories, Inc., Cambridge, MA (US)

(72) Inventors: Abraham P. Vinod, Cambridge, MA (US); Giorgos Mamakoukas, Chicago, IL (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 355 days.

(21) Appl. No.: 17/804,487

(22) Filed: May 27, 2022

(65) Prior Publication Data
US 2023/0384762 A1 Nov. 30, 2023

(51) Int. Cl.
*G05B 19/4155* (2006.01)

(52) U.S. Cl.
CPC .......... *G05B 19/4155* (2013.01); *G05B 2219/40517* (2013.01)

(58) Field of Classification Search
None
See application file for complete search history.

(56) References Cited

U.S. PATENT DOCUMENTS

2017/0139423 A1* 5/2017 El Ferik .............. G05D 1/0295

* cited by examiner

*Primary Examiner* — Sean Shechtman
(74) *Attorney, Agent, or Firm* — Gene Vinokur

(57) ABSTRACT

To control a motion of a device subject to constraints, a sequence of states and corresponding control inputs are transformed into a lifted space to determine a linear model of the dynamics of the device in the lifted space by minimizing fitting errors between the lifted states and approximation of the lifted states according to the linear control law. The fitting errors define an error model as a function bounding a data-driven envelope of a Lipschitz continuity on the fitting errors allowing to solve an optimal control problem in the lifted space according to the linear model subject to the constraints reformulated based on an evolution of the error model. The control input in the lifted space is transformed back to the original space for control.

15 Claims, 13 Drawing Sheets

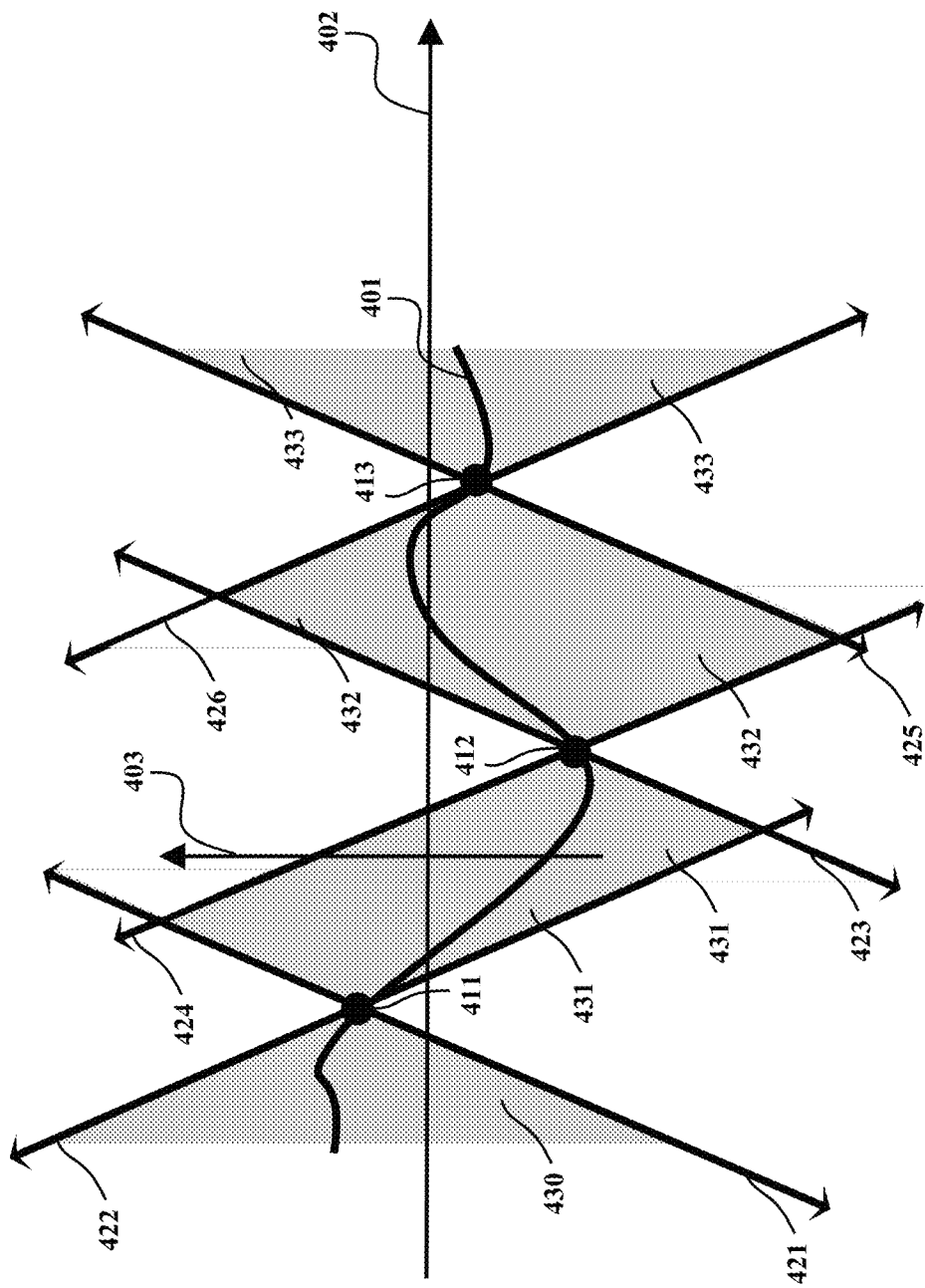

SYSTEM AND METHOD FOR INDIRECT DATA-DRIVEN CONTROL UNDER CONSTRAINTS

TECHNICAL FIELD

The invention relates generally to system control, and more particularly to methods and apparatus for indirect data-driven control of a constrained system.

BACKGROUND

Control theory in control systems engineering is a subfield of mathematics that deals with the control of continuously operating dynamical systems in engineered processes and machines. The objective is to develop a control policy for controlling such systems using a control action in an optimum manner without delay or overshoot and ensuring control stability.

For example, optimization-based control and estimation techniques, such as model predictive control (MPC), allow a model-based design framework in which the system dynamics and constraints can directly be taken into account. MPC is used in many applications to control dynamical systems of various complexities. Examples of such systems include production lines, car engines, robots, numerically controlled machining, satellites, and power generators. However, in a number of situations, an analytical model of a controlled system is unavailable, difficult to update in real-time, or inaccurate. Examples of such cases are prevalent in robotics, building control (HVAC), vehicles, smart grids, factory automation, transportation, self-tuning machines, and traffic networks.

In the absence of physical models of dynamical systems, some control methods exploit operational data generated by these systems in order to construct feedback control policies that stabilize the system dynamics or embed quantifiable control-relevant performance. The use of data to design control policies is called data-driven control. There are two kinds of data-driven control methods: indirect methods that first construct a model of the system and then leverage the model to design controllers or direct methods that directly construct control policies from data without the intermediate model-building step.

A drawback of indirect methods is the potential requirement of large quantities of data in the model-building phase. Conversely, direct methods require fewer data. However, even cutting-edge direct control methods experience difficulties in handling constraints that are imperative for maintaining safe operation in closed-loop control systems. See, e.g., U.S. Pat. No. 11,106,189.

Accordingly, there is a need to reduce the requirement of large quantities of data for the model-building phase of the indirect data-driven control method. Additionally or alternatively, there is a need for a system and a method for an indirect data-driven control suitable for optimization-based control under constraints and learned from a practical amount of data.

SUMMARY

It is an object of some embodiments to provide a system and a method for an indirect data-driven control suitable for optimization-based control under constraints. Additionally or alternatively, there is a need to reduce the requirement of large quantities of data for a model-building phase of the indirect data-driven control method such that the indirect data-driven control is learned from a practical amount of data.

Some embodiments are based on a recognition that the requirement of large quantities of data for a model-building phase of the indirect data-driven control method comes from a desire to build an accurate data-driven model that accurately captures the physics of dynamics of the controlled device. The full physics-based model of modern systems is typically captured by a partial differential equation (PDE) or an ordinary differential equation (ODE), so it should not come as a surprise that the amount of data needed for capturing such a model would indeed be huge. Hence, most of the current data-driven methods are not suitable for estimating the model of the system that captures the physical dynamics of the system.

Some embodiments are based on understanding that the desire to build an accurate data-driven model can be replaced with a desire to build a linear model of the dynamics of the system. Intuitively, building the linear model may require less data than building a full physics-based model and provides many practical advantages for optimal control. For example, the linear model leads to convex optimization rather than non-convex optimization of the PDE or ODE-based models. The convex optimization reduces the computational requirements of the controllers and may be implemented as embedded systems.

However, the linear control, while advantageous may lead to inaccurate motion estimation. Moreover, these inaccuracies may accumulate over time resulting in unsafe control under constraints. To that end, it is an object of some embodiments to build an error model that can account for these inaccuracies. This approach is advantageous over trying to reduce the inaccuracies because the linear control model participates in the optimization while the errors participate in the constraint modification, which is simpler. As such, the complicated part of the controller can be simplified to reduce the amount of data needed for building a model in the indirect data-driven control and for computational resources for using that model. Conversely, the error function is separately used as the constraints modifier to account for the simplification.

However, some embodiments are based on another realization that the error model depends not only on the linear control law but on the way this linear control law is constructed. In such a manner, the error model may capture the dynamics of the control law to address the accumulation of the errors.

Some embodiments are based on the realization that one way to construct the linear control law is by using a Koopman operator in a lifted space. In this way, the control law can be constructed using regression and/or by fitting the estimation of the linear control law into the data in the lifted space. Because of the fitting procedure for constructing the linear control law, the fitting errors can be used to build the error model. For example, an error function parameterized on the lifted states and the lifted control inputs can be determined to bound a data-driven envelope of a Lipschitz continuous function of the fitting errors.

Accordingly, one embodiment discloses a controller for controlling a motion of a device subject to constraints on the motion of the device, the controller comprising: a processor; and a memory having instructions stored thereon that, when executed by the processor, cause the controller to: collect a sequence of states of the device and a corresponding sequence of control inputs transitioning states in the sequence of states of the device according to a non-linear dynamics of the device, wherein each state and each control input are selected from a state-input space having dimensions defined by dimensions of the state and dimensions of the control input; transform the states and the control inputs from the state-input space into a lifted space with dimensions higher than the dimensions of the state-input space to produce a sequence of lifted states transitioned according to a sequence of lifted control inputs; determine a linear model of dynamics of the device in the lifted space approximating transitions of the lifted states according to the lifted control inputs by minimizing fitting errors between the lifted states and approximation of the lifted states according to the linear control law; determine a modeling error as a function parameterized on the lifted states and the lifted control inputs bounding a data-driven envelope of a Lipschitz continuity on the fitting errors; solve an optimal control problem in the lifted space over a prediction horizon optimizing the motion of the device according to the linear model subject to the constraints reformulated based on an evolution of the error model within the prediction horizon to produce a lifted next control input; transform the lifted next control input into the state-input space to produce a next control input; and submit the next control input to an actuator of the device to change the state of the device.

Another embodiment discloses a method for controlling a motion of a device subject to constraints on the motion of the device, wherein the method uses a processor coupled with stored instructions implementing the method, wherein the instructions, when executed by the processor carry out steps of the method, including collecting a sequence of states of the device and a corresponding sequence of control inputs transitioning states in the sequence of states of the device according to a non-linear dynamics of the device, wherein each state and each control input are selected from a state-input space having dimensions defined by dimensions of the state and dimensions of the control input; transforming the states and the control inputs from the state-input space into a lifted space with dimensions higher than the dimensions of the state-input space to produce a sequence of lifted states transitioned according to a sequence of lifted control inputs; determining a linear model of dynamics of the device in the lifted space approximating transitions of the lifted states according to the lifted control inputs by minimizing fitting errors between the lifted states and approximation of the lifted states according to the linear control law; determining a modeling error as a function parameterized on the lifted states and the lifted control inputs bounding a data-driven envelope of a Lipschitz continuity on the fitting errors; solving an optimal control problem in the lifted space over a prediction horizon optimizing the motion of the device according to the linear model subject to the constraints reformulated based on an evolution of the error model within the prediction horizon to produce a lifted next control input; transforming the lifted next control input into the state-input space to produce a next control input; and submitting the next control input to an actuator of the device to change the state of the device.

Yet another embodiment discloses a non-transitory computer-readable storage medium embodied thereon a program executable by a processor for performing a method for controlling a motion of a device subject to constraints on the motion of the device, the method including collecting a sequence of states of the device and a corresponding sequence of control inputs transitioning states in the sequence of states of the device according to a non-linear dynamics of the device, wherein each state and each control input are selected from a state-input space having dimensions defined by dimensions of the state and dimensions of the control input; transforming the states and the control inputs from the state-input space into a lifted space with dimensions higher than the dimensions of the state-input space to produce a sequence of lifted states transitioned according to a sequence of lifted control inputs; determining a linear model of dynamics of the device in the lifted space approximating transitions of the lifted states according to the lifted control inputs by minimizing fitting errors between the lifted states and approximation of the lifted states according to the linear control law; determining a modeling error as a function parameterized on the lifted states and the lifted control inputs bounding a data-driven envelope of a Lipschitz continuity on the fitting errors; solving an optimal control problem in the lifted space over a prediction horizon optimizing the motion of the device according to the linear model subject to the constraints reformulated based on an evolution of the error model within the prediction horizon to produce a lifted next control input; transforming the lifted next control input into the state-input space to produce a next control input; and submitting the next control input to an actuator of the device to change the state of the device.

BRIEF DESCRIPTION OF THE DRAWINGS

FIG. 4 shows a data-driven envelope available for a Lipschitz continuous function, according to some embodiments of the present disclosure.

DETAILED DESCRIPTION

Figure 1A:
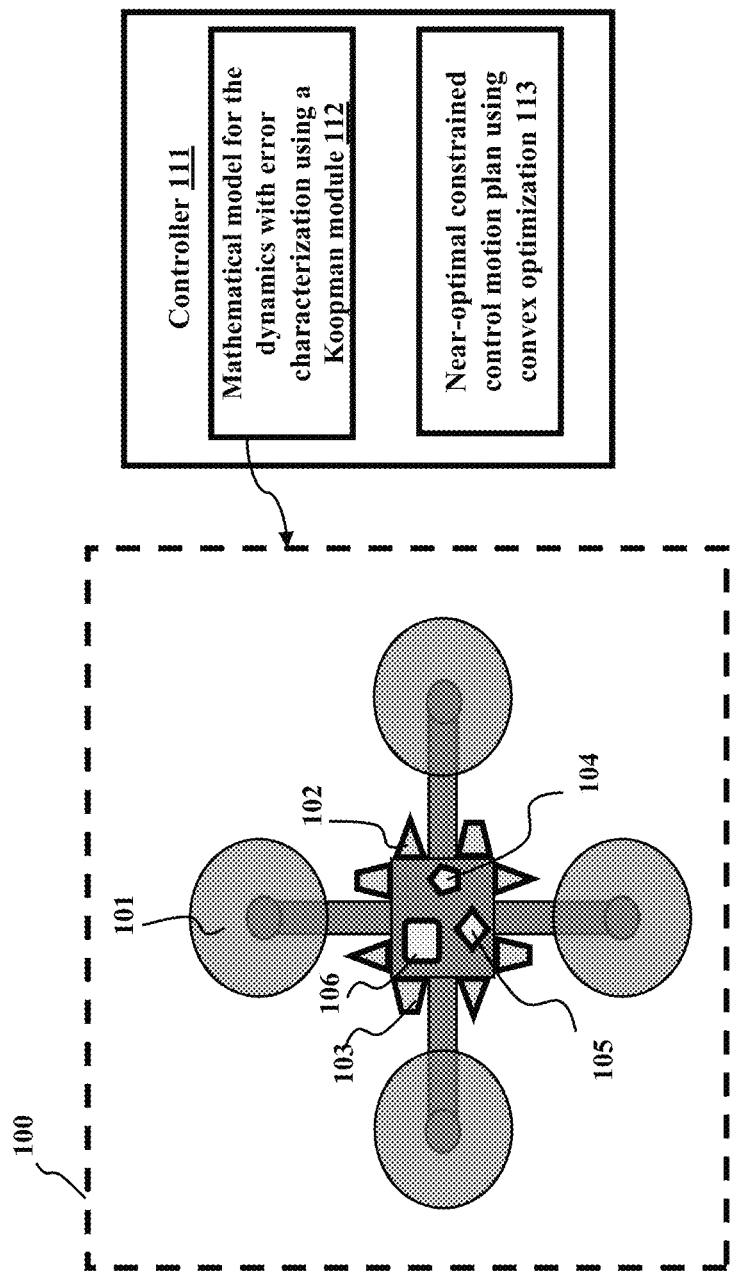
FIG. 1A illustrates a controller for controlling a device, according to some embodiments of the present disclosure.

The embodiments of the present disclosure disclose a control system for generating a controller for optimizing motion trajectory to control motion of a device using data and no prior knowledge of a mathematical model describing the dynamics so that a pre-specified task is completed, which requires the motion of each device to satisfy one or more constraints. Examples of such constraints include achieving a corresponding goal, represented by a target position, and staying within safe operating bounds. Example of devices include autonomous ground vehicles, such as cars or robots in factory automation, aircraft on airport surfaces, and unmanned aerial vehicles such as drones for infrastructure monitoring or inspections.

It is an objective of some embodiments to solve the optimization problem of the motion trajectory of a device with apriori unknown dynamical constraints using only data. In particular, it is an objective of some embodiments to devise two algorithms to solve a constrained optimal control problem, where the first algorithm transforms data collected from past experiments on the device to describe an approximate mathematical model for the dynamical constraint of the device consistent with the available data and provide a characterization of the possible error in the model, and the second algorithm solves a convex optimization problem for real-time planning and control of the device to complete a pre-specified task.

Some embodiments are based on the realization that Koopman operator theory may be used to obtain a linear model in an appropriately defined high-dimensional latent space. Here, the latent space is a span of a collection of nonlinear transformations on the state and the history of state-input pairs of the device.

It is also a realization that existing approaches to Koopman operator theory ignores modeling error present in the computed linear model during control. The omission of the modeling error can cause constraint violation and loss of safety and performance when completing a task.

Some embodiments are based on the realization that an evaluation of the modeling error is already available as part of the Koopman operator design at the pre-specified data points. Specifically, the residuals from fitting a linear model in the latent space to the data can be provided to a function approximator. The function approximator can then be utilized to provide bounds on the modeling error in previously unseen pairs of latent state and input.

Some embodiments are based on the realization that the bounds from a function approximator endows a trajectory satisfying the linear model derived from the Koopman operator theory for some sequence of control inputs, referred to in this disclosure as a surrogate trajectory, with a collection of bounded sets. These bounded sets have the property that a trajectory corresponding to any admissible dynamical constraints consistent with the available data lie in these bounded sets defined around the surrogate trajectory.

Some embodiments are based on the realization that a function approximator that requires the function to be Lipschitz continuous may be used. It is also a realization for such function approximators the sets defined around the surrogate trajectory are hypercylinders such that the radii of these hypercylinders are related to the surrogate trajectory and the control inputs via convex constraints. Thus, it is a realization that we can use convex optimization to identify the control sequence can be constructed that obtains a motion trajectory that satisfies all constraints pertaining to the task while minimizing the cost function pertaining to the task.

Some embodiments use a controller that combines Koopman theory and convex optimization to design a motion trajectory for a device that completes the task without the knowledge of the dynamical constraint on the device and robust to the uncertainty in the mathematical model constructed from data. Since the controller computation is a convex program, such a controller incurs minimal computational cost and memory.

Some embodiments are based on the realization that a robust controller that combines Koopman theory and convex optimization in a model predictive control paradigm. Specifically, the optimal motion trajectory generated by the controller is executed up to a pre-specified time horizon by every device, and then the controller is re-evaluated. Based on the time horizon, we can also reduce the horizon over which the optimal motion trajectory must be constructed by the safety filter, which further reduces the computational requirement on the controller. Naturally, additional constraints on the device motions based on recursive feasibility requirements must be added to the optimization problem to ensure that subsequent iterations of the controller admit an optimal motion trajectory.

FIG. 1A illustrates a schematic of a controller 111 for controlling a device 100, according to the embodiments of the present disclosure. Examples of the device 100 may include, but are not limited to, autonomous vehicles, mobile robots, aerial drones, ground vehicles, aerial vehicles, surface water vehicles, and underwater vehicles, and the like. In FIG. 1A, a schematic of a quadcopter drone, as an example of the device 100 in the embodiments of the present disclosure is shown. The device 100 includes actuators that cause motion of the device 100, and sensors for perceiving environment and location of the device 100. Hereinafter, the device 100 is also referred to as drone 100. As shown in FIG. 1A, the rotor 101 may be the actuator, the sensor perceiving the environment may include light detection and ranging 102 (LIDAR) and cameras 103. Further, sensors for localization may include GPS or indoor GPS 104. Such sensors may be integrated with an inertial measurement unit (IMU). The drone 100 also includes a communication transceiver 105, for transmitting and receiving information, and a control unit 106 for processing data obtained from the sensors and transceiver 105, for computing commands to the actuators 101, and for computing data transmitted via the transceiver 105.

Further, based on the information transmitted by the drone 100, a controller 111 is configured to control motion of the drone 100 by computing a motion trajectory for the drone 100. The motion trajectory for the drone 100 is formed by a sequence of states for the drone, where the state of the drone 100 may include a position of the drone 100 subject to constraints on the motion of the drone 100.

The controller 111 controls the motion of the drone 100 to perform a pre-specified task. The task may include a collection of constraints on the motion of the drone, and a cost objective that must minimized. The controller 111 controls the motion of the drone 100 using a Koopman model 112 and a convex optimization-based control module 113. The Koopman module 112 is typically trained in advance, e.g., offline or online prior to the control, to identify a linear model of dynamics of the system that describes the available data about the dynamical system. The convex optimization module 113 then uses convex optimization and robust optimal control theory to design a motion trajectory that completes the task.

Figure 1B:
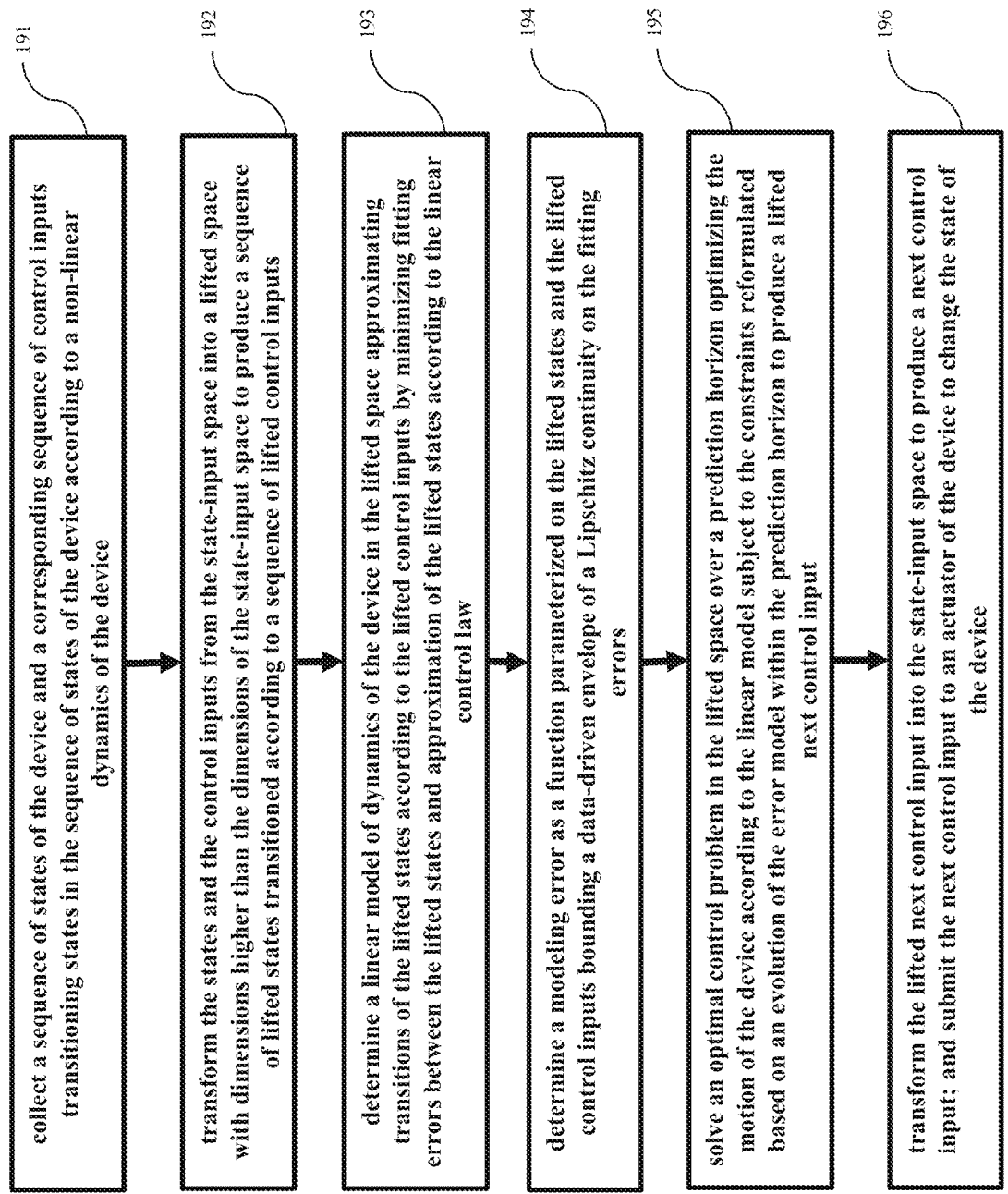
FIG. 1B shows a block diagram of a method for controlling a motion of a device according to some embodiments of the present disclosure.

FIG. 1B shows a block diagram of a method for controlling a motion of a device according to some embodiments of the present disclosure. The method is executed by a controller for controlling a motion of a device subject to constraints on the motion of the device using a processor; and a memory having instructions stored thereon that, when executed by the processor, carry steps of the method.

The method collects 191 a sequence of states of the device and a corresponding sequence of control inputs transitioning states in the sequence of states of the device according to a non-linear dynamics of the device, wherein each state and each control input are selected from a state-input space having dimensions defined by dimensions of the state and dimensions of the control input.

The method transforms 192 the states and the control inputs from the state-input space into a lifted space with dimensions higher than the dimensions of the state-input space to produce a sequence of lifted states transitioned according to a sequence of lifted control inputs.

The method determines 193 a linear model of dynamics of the device in the lifted space approximating transitions of the lifted states according to the lifted control inputs by minimizing fitting errors between the lifted states and approximation of the lifted states according to the linear control law. The method determines 194 a modeling error as a function parameterized on the lifted states and the lifted control inputs bounding a data-driven envelope of a Lipschitz continuity on the fitting errors.

The method solves 195 an optimal control problem in the lifted space over a prediction horizon optimizing the motion of the device according to the linear model subject to the constraints reformulated based on an evolution of the error model within the prediction horizon to produce a lifted next control input.

The method transforms 195 the lifted next control input into the state-input space to produce a next control input; and submit the next control input to an actuator of the device to change the state of the device.

Figure 1C:
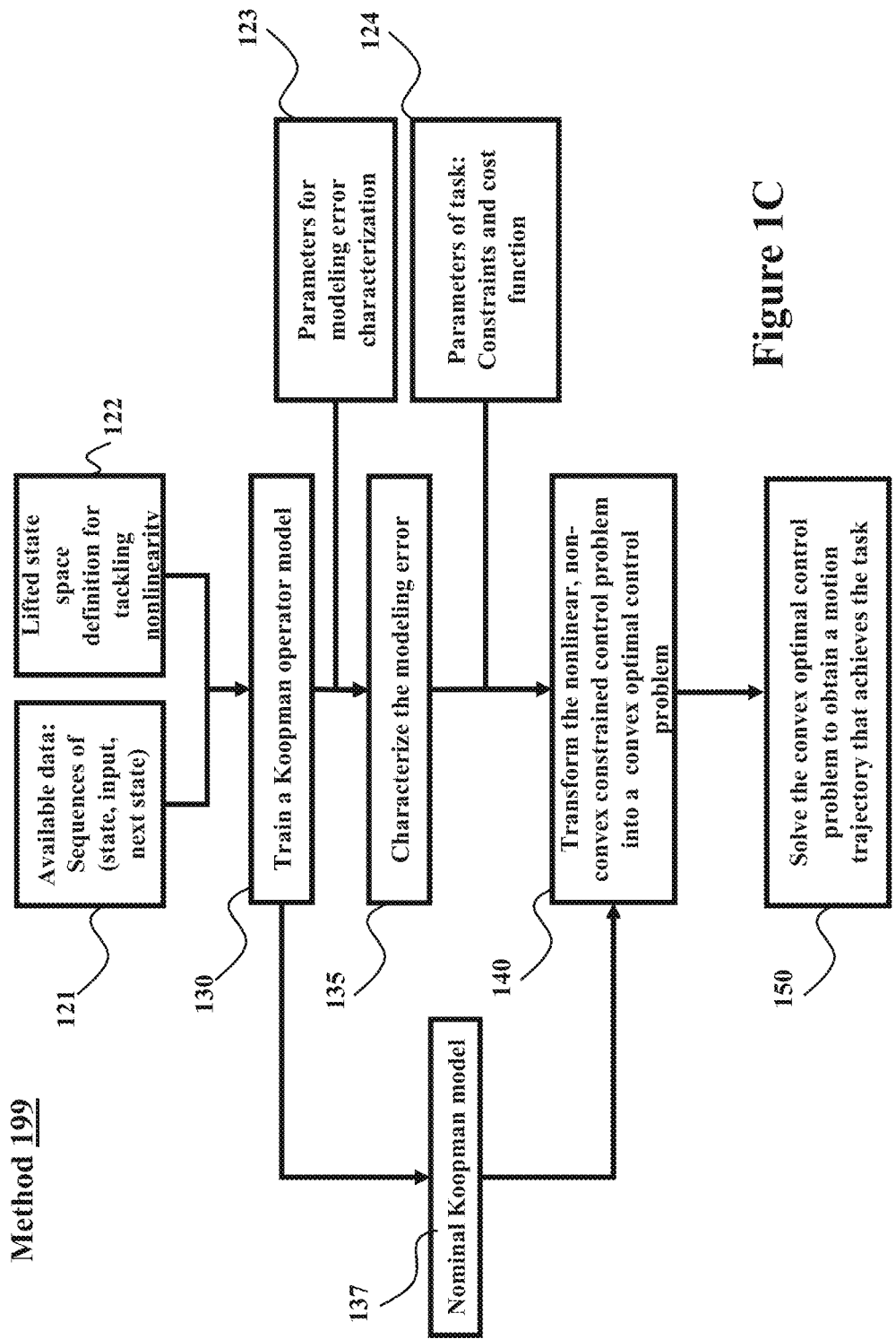
FIG. 1C shows a block diagram of a method for controlling a motion of a device using Koopman-based modeling according to examplar embodiments of the present disclosure.

FIG. 1C shows a block diagram of a method 199 for controlling a motion of a device using Koopman-based modeling, according to some embodiments of the present disclosure. In some embodiments, the linear model of dynamics of the device is determined using Koopman-based modeling. Specifically, the Koopman module 112 takes as input the available data 121 which are some known motion trajectories executed by the dynamical system. The available data 121 consist of sequences of a tuple containing some state of the drone 100, some applied input which could be the actuation provided to the rotor 101, and the consequent next state of the drone 100. The available data 121 may be obtained by running experiments on the drone 100 and correspond to some unknown nonlinear dynamics associated with the drone 100.

The Koopman module 112 also takes as input a description of a latent state space 122, also known in the literature as the lifted space. The latent state space contains the original state space of the drone 100 and additional known nonlinear transformations of the state. The Koopman theory guarantees, that even if the dynamics of the drone 100 are nonlinear in the original state space of the drone 100, a linear description is available in an appropriately chosen latent state space.

Unfortunately, existing literature do not provide a prescriptive method to choose a minimal lifted state space that is appropriate for the given dynamics. Existing practice, which we follow as well, is to use a sufficiently large-dimensional, latent state space that can be presumed to contain the appropriate minimal lifted space.

Next, the Koopman module 112 constructs a linear model in the latent space in 130. The linear model can be constructed in several ways, including minimizing the sum of the residuals of the fit corresponding to a linear model that is optimized among the available data 121. The linear model can also be constrained to satisfy additional properties like the produced model is stabilizable, sparse, or has specific structure consistent with available expert knowledge about the dynamics of the drone 100. In some embodiments, the linear model as the nominal Koopman model 137.

Existing approaches stop at 130 and then move on to constructing an optimal control problem using the computed data-driven model. However, it is a realization that such models will suffer from modeling error because of two reasons. First, the latent space provided to the Koopman model may not admit a linear description of the dynamics of the drone 100. Second, since only a finite amount of data is used, the constructed linear model is typically approximate. These reasons motivate the need for the step 130 where we characterize the modeling error.

In step 135, we characterize an error model using the fit residuals from 130, and takes as input various parameters 123 for the error model. The parameters in 123 can include model parameters like the Lipschitz constant of the error model or hyperparameters of a Gaussian process model or hyperparameters of a neural network. The constructed error model depends on the state and the input of the drone 100 and coincides with the fit residuals at the available data. At all other state and input pairs, the error model could generate either deterministic bounds for the value of the model error or provide a stochastic description of the model error. Consequently, given a nominal trajectory that satisfies the nominal Koopman model dynamics, the error model computed in 135 yields sets around the nominal trajectory within which the true trajectory of the drone is guaranteed to lie with either absolute certainty or high probability.

In step 140, we take the parameters of the task 124 that provide the cost function to minimize and the constraints the state of the drone 100 should satisfy to formulate a nonlinear, non-convex constrained optimal control problem. We then utilize the nominal Koopman model 137 computed in 130 and the model error characterization computed in 135 to approximate the non-convex cost and non-convex constraints of the optimal control problem with a convex cost and a set of convex constraints.

In step 150, we solve the convex approximation of the optimal control problem to obtain a motion trajectory that completes the task. The convexity of the reformulated optimal control problem enables real-time implementation of the approach on a drone 100 that has limited computational resources.

Exemplar Formulation of a Data-Driven Optimal Control Problem

Figure 1D:
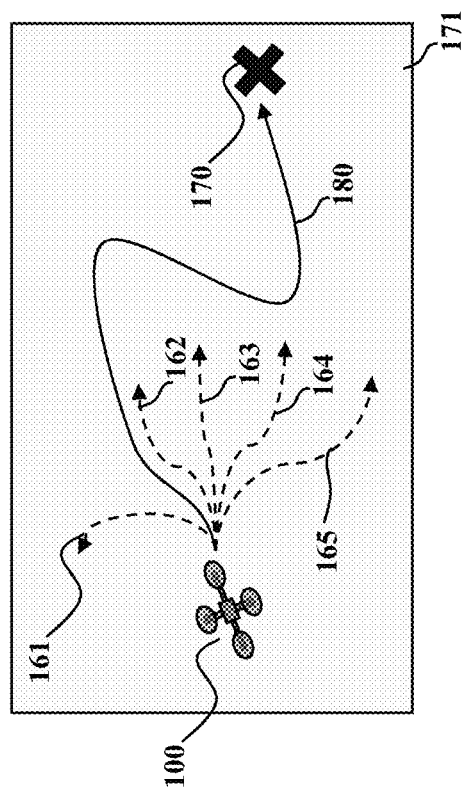
FIG. 1D illustrates a data-driven optimal controller design problem, according to some embodiments of the present disclosure.

FIG. 1D illustrates a data-driven optimal controller design problem, according to some embodiments of the present disclosure. In FIG. 1C, we have a collection of trajectories 161, 162, 163, 164, and 165 sampled at regular intervals as the available data. Recall that the available data consists of a sequence of tuples with some state, some input, and the corresponding data. The task is to navigate the drone 100 to the goal 170 while staying within the environment bounds 171 without the prior knowledge of the nonlinear dynamics describing the drone.

Koopman Modeling

Figure 2A:
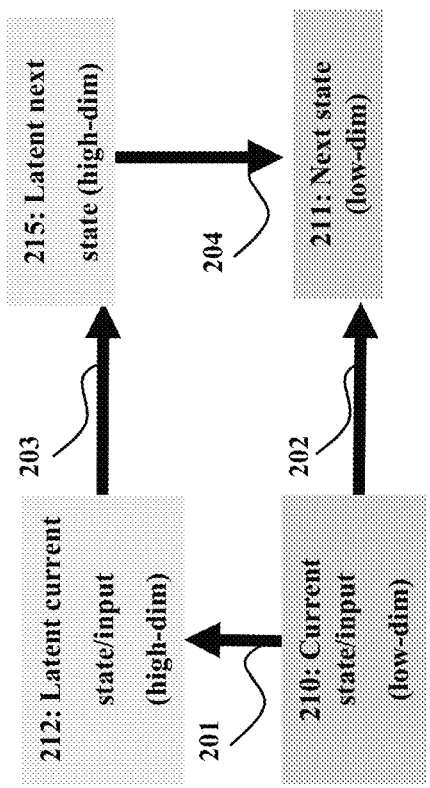
FIG. 2A shows a schematic of components involved in Koopman-based modeling, according to some embodiments of the present disclosure.

FIG. 2A shows a schematic of components involved in Koopman-based modelling, according to some embodiments of the present disclosure. Let $(x_t, u_t)$ denote the state-input pair 210 of the drone 100 at time t. We denote the next state 211, i.e., the state of the drone 100 at time t+1, using $x_{t+1}$. The relationship between the state-input pair 210 and the corresponding next state 211 is given by the following nonlinear dynamics 202, $$x_{t+1} = f(x_t, u_t), \quad (1)$$

where f is an apriori unknown function mapping the current state and input to the next state.

The Koopman modeling uses a high-dimensional latent space 212 to describe the nonlinear dynamics. Specifically, we use a nonlinear transformation 201, referred to as a latent space map $\Psi$, that maps the state at time t, and a history of states and inputs up to some pre-specified $n_x$ and $n_u$ time steps in state and input respectively into a latent space variable $\psi_t$. Formally, $$\psi_t = \Psi(x_t, x_{t-1}, u_{t-1}, \ldots, x_{t-n_x}, u_{t-n_u}). \quad (2)$$

From (2), the latent space 212 which is the range of the latent space map $\Psi$. Note that the dimension of $\psi_t$ is significantly higher than the dimension of the original state $x_t$ of the drone 100. Consequently, the latent space is also known as the lifted state space.

The latent space map $\Psi$ is typically chosen such that one can retrieve the state $x_t$ from the latent space variable $\psi_t$ using another map 204. Some embodiments of the presented disclosure include the original state space in the latent space such that, $$x_t = C\psi_t, \quad (3)$$

for some appropriately defined matrix C. Note that (3) is an affine transformation.

The Koopman modeling states that, for an appropriately chosen $\Psi$, there exists matrices A, B such that the dynamics in the latent space is linear 203. Specifically, $$\psi_{t+1} = A\psi_t + Bu_t, \text{ where} \quad (4a)$$

$$(A,B) = \arg\min_{(A,B)} \sum_{j=1}^{M} \|\psi_{t+1}^{data,j} - A\psi_t^{data,j} - Bu_t^{data,j}\|^2 \quad (4b)$$

where A, B are obtained by solving the least-squares problem in (4b) or other regression techniques from a collection of M data points $\{(\psi_t^{data,j}, u_t^{data,j}, \psi_{t+1}^{data,j})\}_{j=1}^{M}$. We refer to the linear model in (4a) as a nominal Koopman model. Existing literature also refers to the model in (4) as a Koopman operator.

Figure 2B:
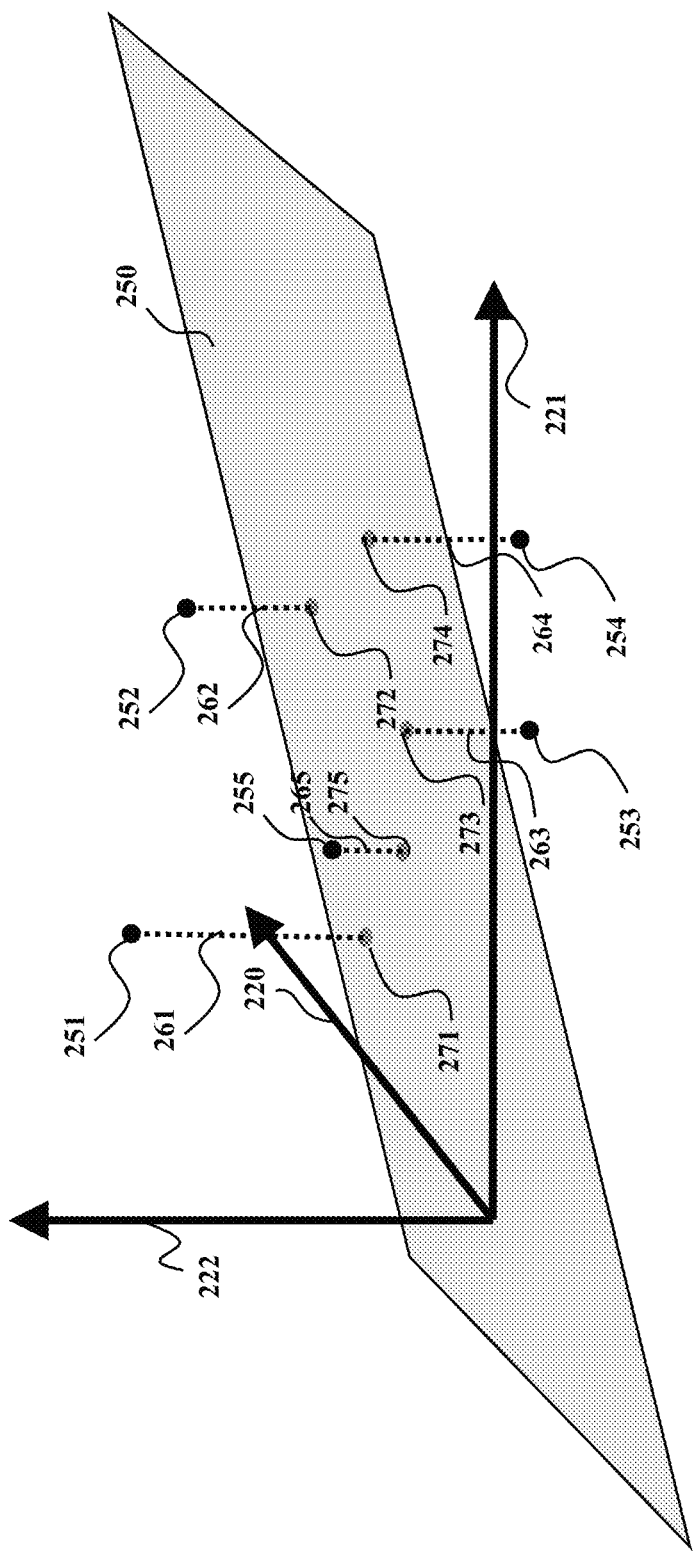
FIG. 2B illustrates the definition of the linear model defined using the Koopman-based modeling and the associated modeling error, according to some embodiments of the present disclosure.

FIG. 2B illustrates the definition of the linear model defined using the Koopman-based modelling and the associated modeling error, according to some embodiments of the present disclosure. Specifically, it considers a hypothetical example where the latent space is one-dimensional and the input is one-dimensional. For clarity of explanation, this disclosure uses the axis dimension 220 to describe the current latent variable, the axis dimension 221 to describe the applied input, and the axis dimension 222 to describe the next latent variable corresponding to the underlying dynamics of the drone 100. Consequently, the available data 121 appear as points in the three-dimensional space spanned by the axis dimensions 220, 221, and 222. Examples of the available data is given as points 251, 252, 253, 254, and 255. The nominal Koopman model in this case is given by the linear hyperline 250. For the current state-input pairs corresponding to the points 251, 252, 253, 254, and 255, it predicts that the next latent states are 271, 272, 273, 274, and 275 respectively. In the event that the latent space map $\Psi$ was chosen correctly, then the points 251-255 would have coincided with 271-275 respectively. However, typically the points would not coincide as shown in FIG. 2B.

The gap between the points 251 and 271 is a fitting error and collectively, all fitting errors can be represented by a modeling error. As used herein, the model error $\epsilon$ as a map that takes the current latent space $\psi_t$ and input $u_t$ and provides the residual in the fit—the difference between the true next latent state and the next latent state predicted by the nominal Koopman model (4). Formally, $$\epsilon(\psi_t, u_t) = \psi_{t+1} - A\psi_t + Bu_t. \quad (5)$$

Clearly, at the available data, we know the precise value of $\epsilon(\psi_t, u_t)$. However, we do not know the value of $\epsilon(\psi_t, u_t)$ at previously unseen latent state and input pairs.

We can utilize existing machine learning machinery to interpolate/extrapolate the values of the modeling error given by (5) beyond the available dataset. These models, which can include neural networks, Gaussian process-based regressors, and Lipschitz-continuous regressors, can then be utilized to provide deterministic or stochastic bounds on the value of the model error $\epsilon(\psi_t, u_t)$ at previously unseen latent state and input pairs $(\psi_t, u_t)$.

Constraint Enforcement Using a Surrogate Trajectory

Given a sequence of control inputs, let the true trajectory be the sequence of states corresponding to (1). We will refer to the corresponding sequence of true latent states as the true latent trajectory. The dynamics of the true latent trajectory can be characterized by the nominal Koopman model, $$\psi_{t+1}^{true} = A\psi_t^{true} + Bu_t + \epsilon(\psi_t^{true}, u_t). \quad (6)$$

However, since $\epsilon$ is an apriori unknown function, the true latent dynamics (6) are unknown, and consequently the true latent trajectory is unknown.

We also define a surrogate trajectory as a motion trajectory based on a nominal Koopman model or a variant of the same, $$\psi_{t+1}^{surr} = A\psi_t^{surr} + Bu_t + \epsilon_t^{surr}. \quad (7)$$

The dynamics in (7) coincides with the nominal Koopman model when $\epsilon_t^{surr} = 0$ for all t. On the other hand, we have a variant of the nominal Koopman model when $\epsilon_t^{surr} \neq 0$. The choice of $\epsilon_t^{surr}$ is pre-determined before computing the surrogate trajectory. $\epsilon_t^{surr}$ can be viewed as an additional hyperparameter that tries to reintroduce the unknown modeling error function $\epsilon$ into the nominal Koopman model. We define the projection of the surrogate trajectory back to the state space as the projected surrogate trajectory.

Figure 3A:
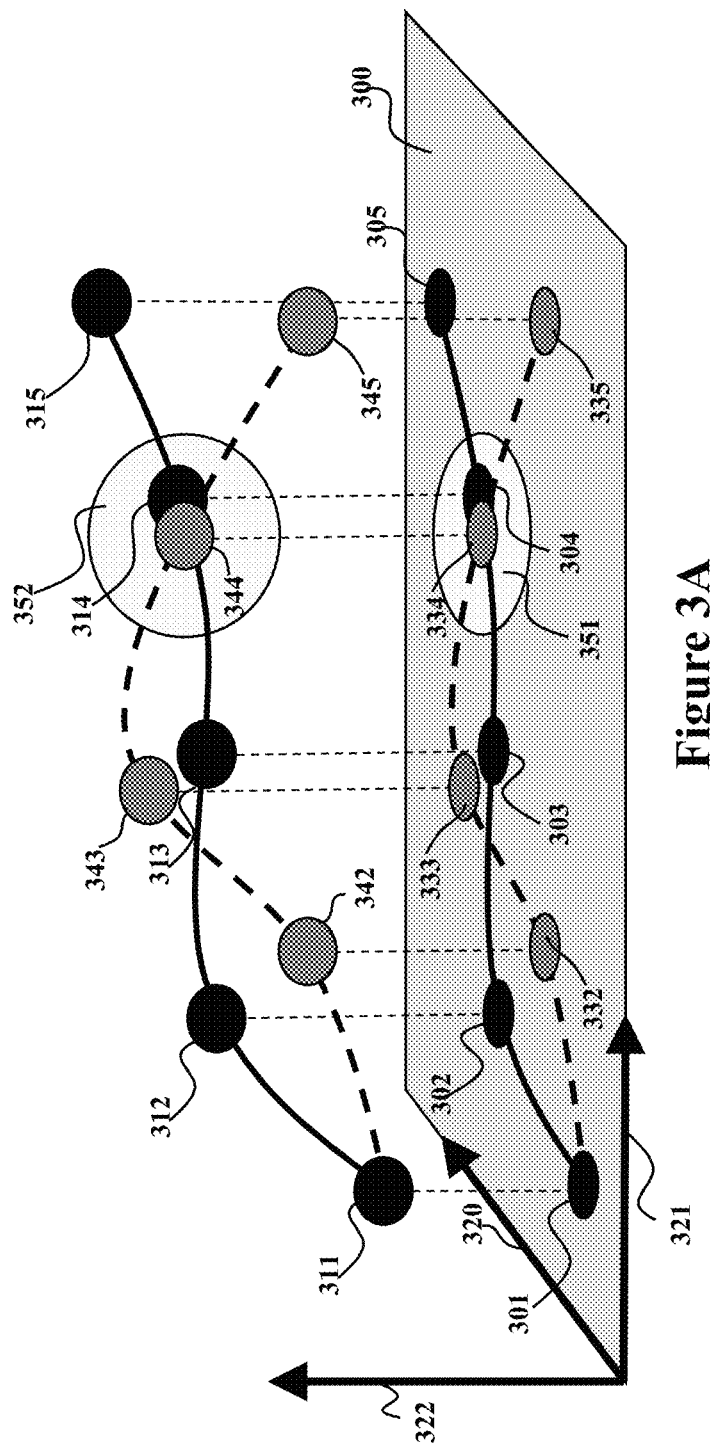
FIG. 3A illustrates the definition of surrogate trajectory and its proximity to the true trajectory, according to some embodiments of the present disclosure.

FIG. 3A illustrates the definition of surrogate trajectory and its proximity to the true trajectory, according to some embodiments of the present disclosure. Here, the space 300 is the original state space of the drone 100 spanned by the axes 320 and 321, let the latent space be the three-dimensional volume spanned by the axes 320, 321, and 322. Let 301 denote the initial state of the drone, and 311 be the corresponding latent state. For some sequence of inputs, the collection of states 302, 303, 304, and 305 characterize the true trajectory, and the collection of latent states 312, 313, 314, and 315 characterize the true latent trajectory. Using the nominal Koopman model or a variant, the collection of latent states 342, 343, 344, and 345 characterize the surrogate trajectory corresponding to the given sequence of inputs, and its projection on to the original state space 332, 333, 334, and 335 characterize the projected surrogate trajectory.

Note that the true latent trajectory may differ from the surrogate trajectory. However, a key desirable property of the surrogate trajectory is that every state in the projected surrogate trajectory is accompanied with a set within which the true trajectory in the original state space is guaranteed to lie either with absolute certainty or with high probability. Similar definitions characterizations can also be made for the surrogate trajectory in the latent space.

In FIG. 3A, the sets 351 and 352 provide examples of such sets. Specifically, we require the surrogate trajectory to be such that there are some radii $\Gamma_t$ for all t such that $$\|C(\psi_t^{true} - \psi_t^{surr})\| \leq \Gamma_t. \tag{8a}$$

Other modifications of definition (8a) include bounding the error with respect to a direction $p_i$, $$\|p_i^T C(\psi_t^{true} - \psi_t^{surr})\| \leq \Gamma_{i,t}, \tag{8b}$$

or the bounding in the latent space (formally, $\|(\psi_t^{true} - \psi_t^{surr})\| \leq \Gamma_t$). We will refer to these sets as bounded deviation sets. Note that the sets in (8a) and (8b) can be interpreted as the deviation of the original state or the latent state space projected along the direction $p_i$ have a finite upper bounds. Consequently, these bounded deviation sets are either hyperballs or hypercylinders.

We emphasize that the true trajectory and the true latent trajectory is generally unknown. On the other hand, the surrogate trajectory and its projection is computable using only the nominal Koopman model or its variant.

Let the halfspace $p_i^T x \leq q_i$ denote a constraint in the original state space 300 that the drone 100 must satisfy for some, $p_i$, $q_i$. Using the definition of latent space, the constraint $p_i^T x \leq q_i$ is equivalent to $$p_i^T C \psi_t^{true} \leq q_i. \tag{9}$$

Let $\Gamma_{i,t} > 0$ be such that $\|p_i C(\psi_t^{true} - \psi_t^{surr})\| \leq \Gamma_{t,i}$ as done in (8b). Then, a sufficient condition for the satisfaction of the constraint (9) is to require that $$p_i^T C \psi_t^{surr} + \Gamma_{i,t} \leq q_i. \tag{10}$$

Equation (10) thus provides a constraint tightening mechanism to tighten the constraint (9).

Figure 3B:
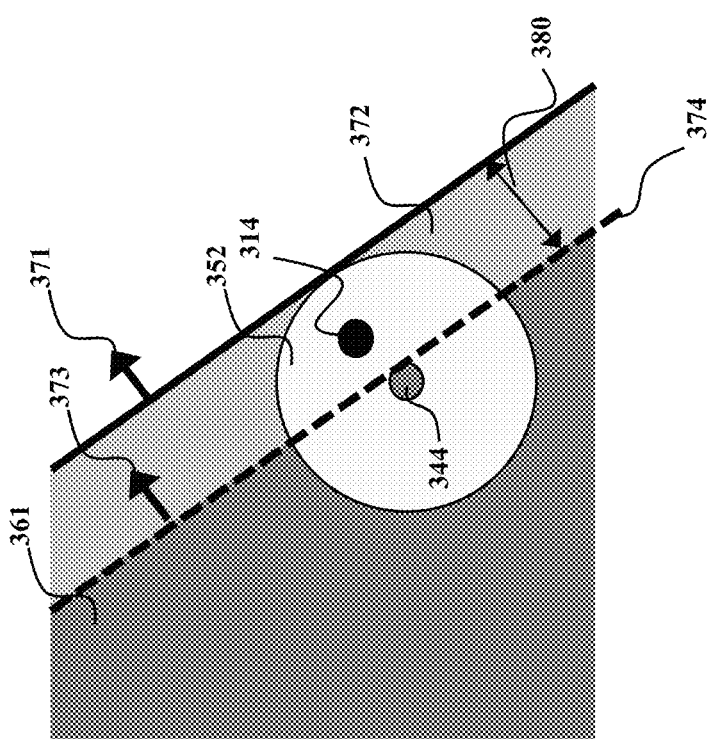
FIG. 3B illustrates the required constraint tightening for the surrogate trajectory for the true trajectory to satisfy a constraint, according to some embodiments of the present disclosure.

FIG. 3B illustrates the required constraint tightening for the surrogate trajectory for the true trajectory to satisfy a constraint, according to some embodiments of the present disclosure. Let the halfspace 372 be characterized by some direction $p_i$ 371 and scalar $q_i$. The true latent state 314 must lie inside the halfspace 372 at some pre-specified time. However, we can not precisely predict the value of the true latent state 314.

We know that the true latent state satisfies (9) if the latent state in the surrogate trajectory satisfies (10). Therefore, we control the surrogate trajectory such that the corresponding latent state in the surrogate trajectory 344 lies inside a shifted halfspace 374 in the same direction $p_i$ 373. The shift 380 in the halfspace is by $\Gamma_{i,t}$ such that the shifted halfspace contains the set 352.

Thus, given the bounded deviation sets associated with the surrogate trajectory constructed using the nominal Koopman model or its variant, we can easily enforce constraints using the bounded deviation sets on the true trajectory and the true latent trajectory despite not knowing the underlying dynamics.

Exemplar Description of Generation of the Sets

We can generate the bounded deviation sets associated with the surrogate trajectory using the properties of the regressor used to characterize the apriori unknown modeling error function $\epsilon$.

One approach is to use machine learning tools like neural networks or Gaussian process regression to fit the function approximator over the residual fits from the nominal Koopman model identification, and then use posteriori bounds from the function approximator to identify the set.

Some embodiments of the presented disclosure utilize an additional assumption on the modeling error. Specifically, when the modeling error function is Lipschitz continuous with a known Lipschitz constant, the bounded deviation sets are hypercylinders with radii $\Gamma_{i,t}$ using a series of recursion.

Recall that a real-valued function h is said to be L-Lipschitz continuous, if for any y, z, $$|h(y) - h(z)| \leq L\|y - z\|. \tag{11}$$

Lipschitz continuity, as described in (11), naturally provides data-driven envelopes to a function. Specifically, given data points $z_i$ and the associated function evaluations $h(z_i)$, we know that for any point y, $$\max_i(h(z_i) - L\|y - z_i\|) \leq h(y) \leq \min_i(h(z_i) + L\|y - z_i\|). \tag{12}$$

Equation (12) provides a data-driven envelope of h that progressively becomes tighter as the number of data points increase and come closer to y. While each data point generates an envelope for h, the max and min operators in (12) pick the largest lower bounding and smallest upper bounding envelopes.

FIG. 4 shows a data-driven envelope available for a Lipschitz continuous function, according to some embodiments of the present disclosure. Given a Lipschitz continuous function 401, and its evaluation at three data points 411, 412, and 413, the shaded regions 430, 431, 432, and 433 denote the data-driven envelopes. These envelopes are defined by the upper and lower bounds on the function values as prescribed in (12). These bounds are defined by rays 421, 422, 423, 424, 425, and 426 emanating from the data points. The slope of these rays are defined by the Lipschitz constant L that is pre-specified.

Observe that the bounds are looser for larger values of L, while the bounds are tighter for smaller values of L. On the other hand, smaller values of L may result in a restrictive model that can underfit the data points, and lead to poor interpolation/extrapolation.

For a prediction horizon of T, it can be shown that for a $L_\epsilon$-Lipschitz continuous modeling error function $\epsilon$, some choice of $\{\epsilon_t^{surr}\}_{t=0}^{T-1}$, some sequence of training points $\{(\psi_t^{train}, u_t^{train})\}_{t=0}^{T-1}$ that is a subset of the available data points, the following recursion applied for every $t \in \{0, 1, 2, \ldots, T-1\}$ provides a lower bound for $\Gamma_{i,t}$ for any linear constraint (9), $$\Gamma_{i,t} \geq \left\| p_i^T C \right\| \left( L_\epsilon \left\| \begin{bmatrix} \psi_{t-1}^{surr} - \psi_{t-1}^{train} \\ u_{t-1} - u_{t-1}^{train} \end{bmatrix} \right\| \right) + \left\| \epsilon(\psi_{t-1}^{train}, u_{t-1}^{train}) - \epsilon_{t-1}^{surr} \right\| + \tag{13a}$$

$$(\|p_i^T C A\| + L_\epsilon \|p_i\|) \Delta_{t-1},$$

$$\Delta_t \geq L_\epsilon \left\| \begin{bmatrix} \psi_{t-1}^{surr} - \psi_{t-1}^{train} \\ u_{t-1} - u_{t-1}^{train} \end{bmatrix} \right\| + \left\| \epsilon(\psi_{t-1}^{train}, u_{t-1}^{train}) - \epsilon_{t-1}^{surr} \right\| + (\|A\| + L_\epsilon) \Delta_{t-1}. \tag{13b}$$

In (13), we use $\|A\|$ to denote the maximum singular value of A. The term $\|\epsilon(\psi_{t-1}^{train}, u_{t-1}^{train}) - \epsilon_{t-1}^{surr}\|$ is zero if $\epsilon_{t-1}^{surr} = \epsilon(\psi_{t-1}^{train}, u_{t-1}^{train})$ for the given set of training points $\{(\psi_t^{train}, u_t^{train})\}_{t=0}^{T}$.

The key property of the recursion in (13) is that it is jointly convex in the decision variables $\psi_t^{surr}$, $u_t$, and $\Gamma_{i,t}$. Consequently, we can design the surrogate trajectory and the corresponding input sequence $\{(\psi_t^{surr}, u_t)\}_{t=0}^{T}$ and the bounding hypercylinder radii $\Gamma_{i,t}$ simultaneously using a single convex program.

Exemplar Description of a Convex Optimal Control Problem Reformulation

Consider the problem of regulating the drone 100 located at a pre-specified initial state $x_0$ towards a goal position g while staying within a convex polytope described by half-spaces $p_i^T x \leq q_i$ for $i \in \{1, 2, \ldots, N\}$.

Let $\psi_0$ denote the latent state corresponding to $x_0$. The original non-convex, constrained optimal control problem in the latent space is given by, $$\text{minimize } \Sigma_{t=1}^{T}(\|C\psi_t^{true}-g\|^2+\|u_{t-1}\|^2) \tag{14a}$$

$$\text{subject to } \psi_t^{true}=A\psi_{t-1}^{true}+Bu_{t-1}+\epsilon(\psi_{t-1}^{true},u_{t-1}), \tag{14b}$$

$$q_i \geq p_i^T C\psi_t^{true}. \tag{14c}$$

The decision variables in (14) are $\psi_t^{true}$ and $u_t$ for $t \in \{1, 2, \ldots, T\}$. In (14), the constraints are enforced for $t \in \{1, 2, \ldots, T\}$ and $i \in \{1, 2, \ldots, N\}$. We cannot solve (14) directly since $\epsilon$ is an unknown function. Additionally, even if $\epsilon$ is known, (14) is a nonlinear, non-convex optimization problem that is hard-to-solve in practice. Thus, we require a convex approximation that finds a suboptimal solution to (14).

For a given set of training points $\{(\psi_t^{train}, u_t^{train})\}_{t=0}^{T-1}$ and some choice of $\{\epsilon_t^{surr}\}_{t=0}^{T-1}$, we solve the following convex optimization problem $$\text{minimize } \sum_{t=1}^{T}(\|C\psi_t^{surr} - g\|^2 + \|u_{t-1}\|^2) \tag{15a}$$

$$\text{subject to } \psi_t^{surr} = A\psi_{t-1}^{surr} + Bu_{t-1} + \epsilon_{t-1}^{surr}, \tag{15b}$$

$$q_i \geq p_i^T C\psi_t^{surr} + \Gamma_{i,t}, \tag{15c}$$

$$\Gamma_{i,t} \geq \|p_i^T C\| \left( L_\epsilon \left\| \begin{bmatrix} \psi_{t-1}^{surr} - \psi_{t-1}^{train} \\ u_{t-1} - u_{t-1}^{train} \end{bmatrix} \right\| + \|\epsilon(\psi_{t-1}^{train}, u_{t-1}^{train}) - \epsilon_{t-1}^{surr}\| \right) + \tag{15d}$$
$$(\|p_i^T CA\| + L_\epsilon \|p_i\|)\Delta_{t-1},$$

$$\Delta_t \geq L_\epsilon \left\| \begin{bmatrix} \psi_{t-1}^{surr} - \psi_{t-1}^{train} \\ u_{t-1} - u_{t-1}^{train} \end{bmatrix} \right\| + \|\epsilon(\psi_{t-1}^{train}, u_{t-1}^{train}) - \epsilon_{t-1}^{surr}\| + (\|A\| + L_\epsilon)\Delta_{t-1}. \tag{15e}$$

The decision variables in (15) are $\psi_t^{surr}$, $u_t$, $\Delta_t$, and $\Gamma_{i,t}$ for $t \in \{1, 2, \ldots, T\}$ and $i \in \{1, 2, \ldots, N\}$. In contrast to (14), (15) is convex and therefore real-time implementable. Additionally, (15) does not require the knowledge of the true dynamics.

Implementation in a Model Predictive Control Paradigm

Some embodiments of the presented disclosure choose $\epsilon_{t-1}^{surr}=\epsilon(\psi_{t-1}^{train}, u_{t-1}^{train})$ and choose $\{(\psi_t^{train}, u_t^{train})\}_{t=0}^{T-1}$ from the available data set by solving an optimal control problem of staying near the initial position safely using only the nominal Koopman model. Specifically, we solve the following optimization problem to identify $\{(\psi_t^{train}, u_t^{train})\}_{t=0}^{T-1}$, $$\text{minimize } \Sigma_{t=1}^{T}(\|C\psi_t^{candidate}-x_0\|^2+\|u_{t-1}\|^2) \tag{16a}$$

$$\text{subject to } \psi_t^{candidate}=A\psi_{t-1}^{candidate}+Bu_{t-1} \tag{16b}$$

$$q_i \geq p_i^T C\psi_t^{candidate}, \tag{16c}$$

The decision variables in (16) are $\psi_t^{candidate}$ and $u_t$ for $t \in \{1, 2, \ldots, T\}$ and $i \in \{1, 2, \ldots, N\}$. The training points $\{(\psi_t^{train}, u_t^{train})\}_{t=0}^{T-1}$ are then selected by projecting the optimal solution of (16) on to the data set, i.e., finding the tuples that are the closest. We emphasize that alternative heuristics based on modification of (16) or the projection technique is also possible.

Figure 5:
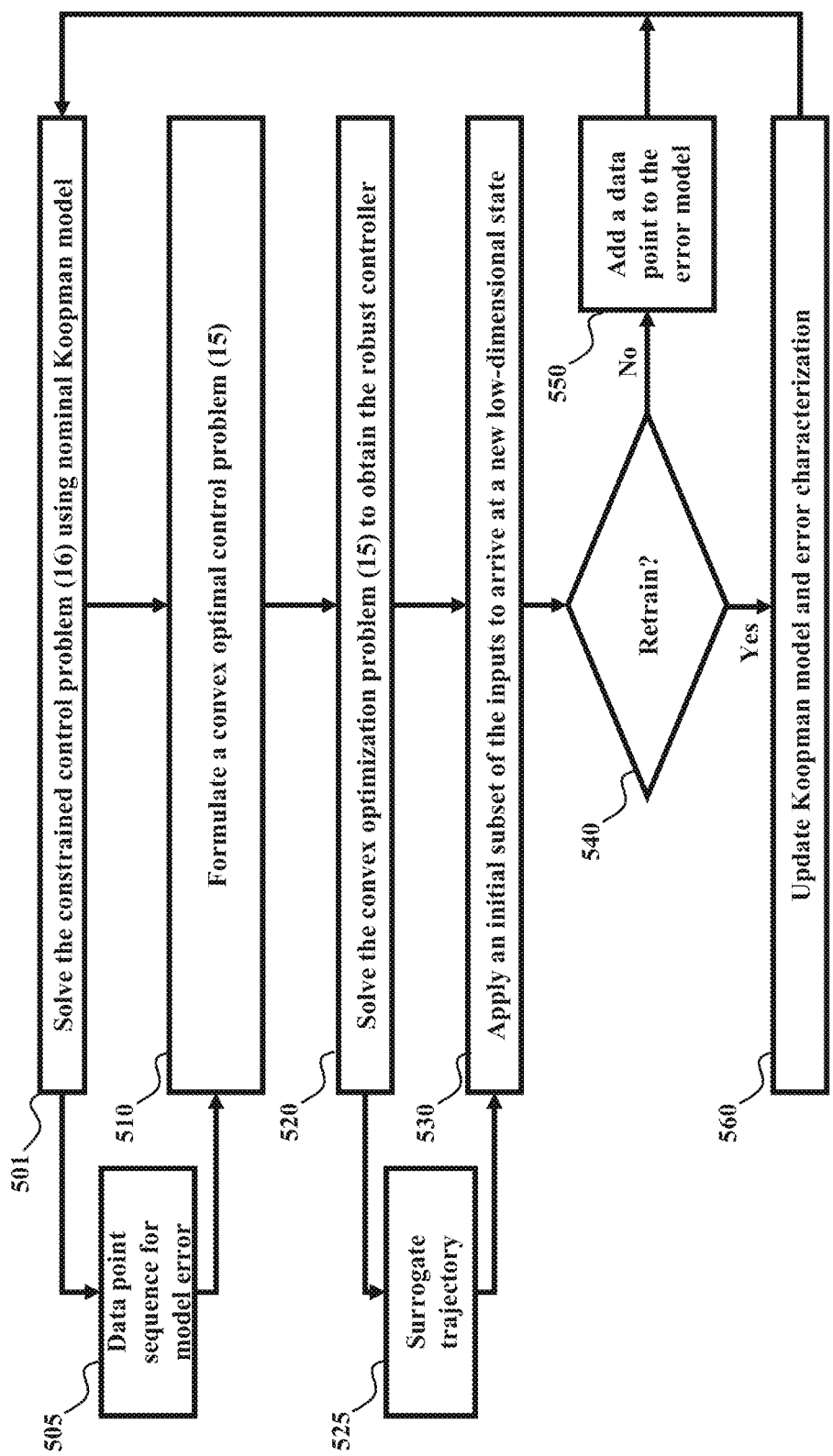
FIG. 5 shows that the proposed solution can be embedded in a receding horizon control, according to some embodiments of the present disclosure.

FIG. 5 shows that the proposed solution can be embedded in a receding horizon control, according to some embodiments of the present disclosure. In 501, we solve (16) to identify the training points $\{(\psi_t^{train}, u_t^{train})\}_{t=0}^{T-1}$. Next, we formulate the optimization problem (15) using these training points 505, and the corresponding choice of $\epsilon_{t-1}^{surr}=\epsilon(\psi_{t-1}^{train}, u_{t-1}^{train})$ in 510. In 520, we solve the convex problem (15) to obtain the surrogate trajectory as well as the corresponding input sequence.

We apply the first input or a collection of initial inputs in 530 to arrive at the new low-dimensional state. Note that at each time step, we have access to the true latent state as well as the predicted latent state from the nominal Koopman model (4). Thus, we have access to additional data points on the modeling error collected during execution using (5). In 540, we need to decide if we must retrain the Koopman model and modeling error characterization or continue with the existing model. If we choose not to retrain, we augment the modeling error characterization with the additional data points to obtain a tighter modeling error characterization in 550, and then move back to step 501. On the other hand, if we choose to retrain, then at additional computational expense, we can obtain a superior nominal Koopman model in 560 thanks to the additional data available. The corresponding modeling error characterization is also typically tighter.

We can also add additional constraints to (15) to endow additional properties on the designed robust controller, including recursive feasibility or stability of the controller. Like existing approaches, we can enforce recursive feasibility and stability by requiring that the terminal latent state lies in an appropriately defined control invariant set that is also robust to the modeling error.

Figure 6:
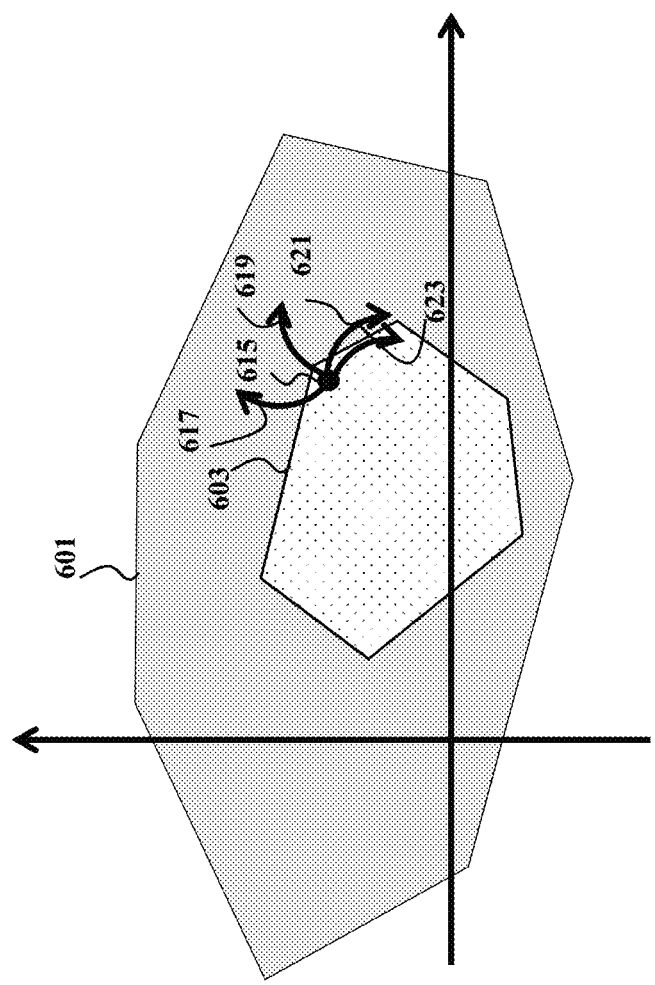
FIG. 6 shows an example of a two-dimensional projection of a control-invariant set corresponding to a constraint set, according to an embodiment of the present disclosure.

FIG. 6 shows an example of a two-dimensional projection of constraints 601 in the lifted space corresponding to constraints 603 in the original state-input space, according to an embodiment of the present disclosure. In this example, the constraints 601 act like a control invariant set for the constraints 603. In an embodiment, the constraint set 601 may be a multi-dimensional polytope determined by hyperplanes, which are represented by linear inequalities, along multiple dimensions corresponding to the constraints on the optimal trajectory of the device 100. The constraint set 601 encodes the states of the device 100 that are safe. Any state of the device 100 within the control invariant set 601, there exists a control command maintaining the state of the device 100 within the set 603 for known or admissible future states. For example, for any state of the device 100 transformed from the set 601 such as a state 615 within the control invariant set 603 and within all possible control commands 617-623 that the controller can execute, there is at least one control command 623 that maintains the state of the device 101 within the set 603. In this exemplar embodiment, the constraints in the state-input space are reformulated into the lifted space such that a solution to the optimal control problem in the lifted space satisfying the reformulated constraints is guaranteed to satisfy the constraints in the state-input space.

Figure 7:
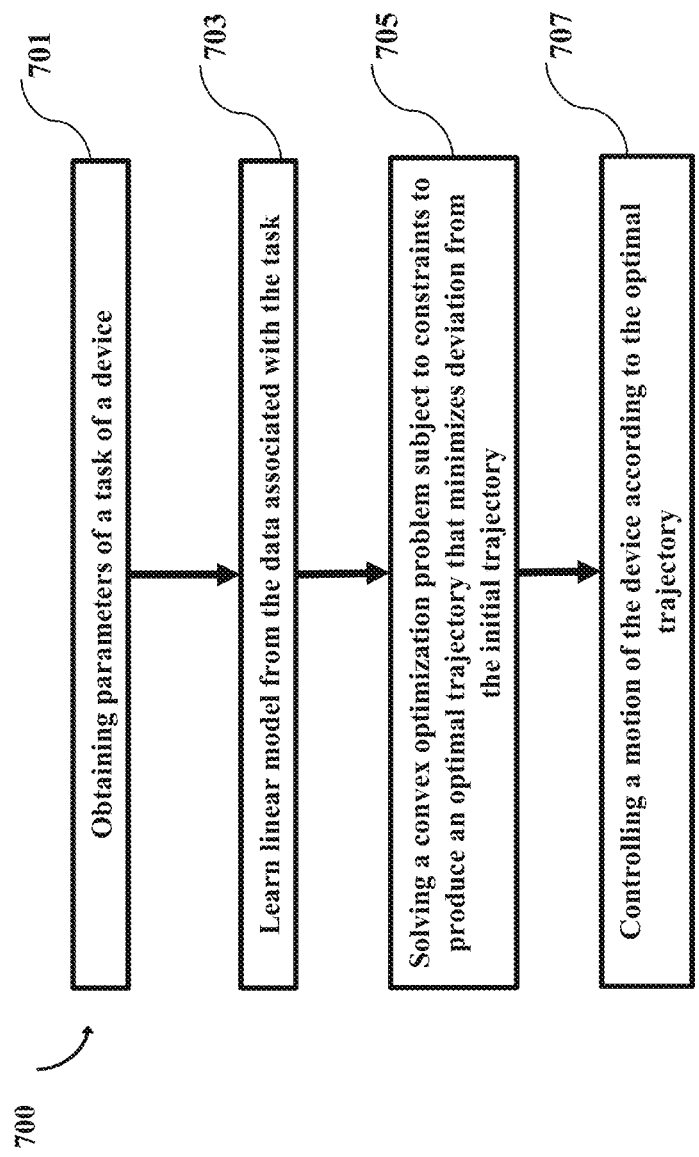
FIG. 7 shows a block diagram of a method for controlling the motion of the device from the initial state to the target state in the environment having obstacles, according to an embodiment of the present disclosure.

FIG. 7 shows a block diagram of a method 700 for controlling the motion of a device from an initial state to a target state in an environment having obstacles, according to an embodiment of the present disclosure. At block 701, method 700 obtains parameters of the task from device 100 and/or a remote server. The parameters of the task include the state of the device 100. In some embodiments, the parameters may include constraints that characterize the task, for example, one or a combination of the initial state of the device 100, the target state of the device 100, a geometrical configuration of one or multiple stationary obstacles defining at least a part of the constraint, and motion of moving obstacles defining at least a part of the constraint. Further, the parameters are submitted to a learned function.

At block 703, method 700 learns the linear model and the error model from the data relevant to the task. At block 705, method 700 includes solving a convex optimization problem subject to the constraints to produce an optimal trajectory ac. In an embodiment, an optimization based safety filter solves the convex optimization problem subject to the constraints as hard constraints, to produce the optimal trajectory. At block 707, the method 700 includes controlling the motion of the device 100 according to the optimal trajectory.

Figure 8:
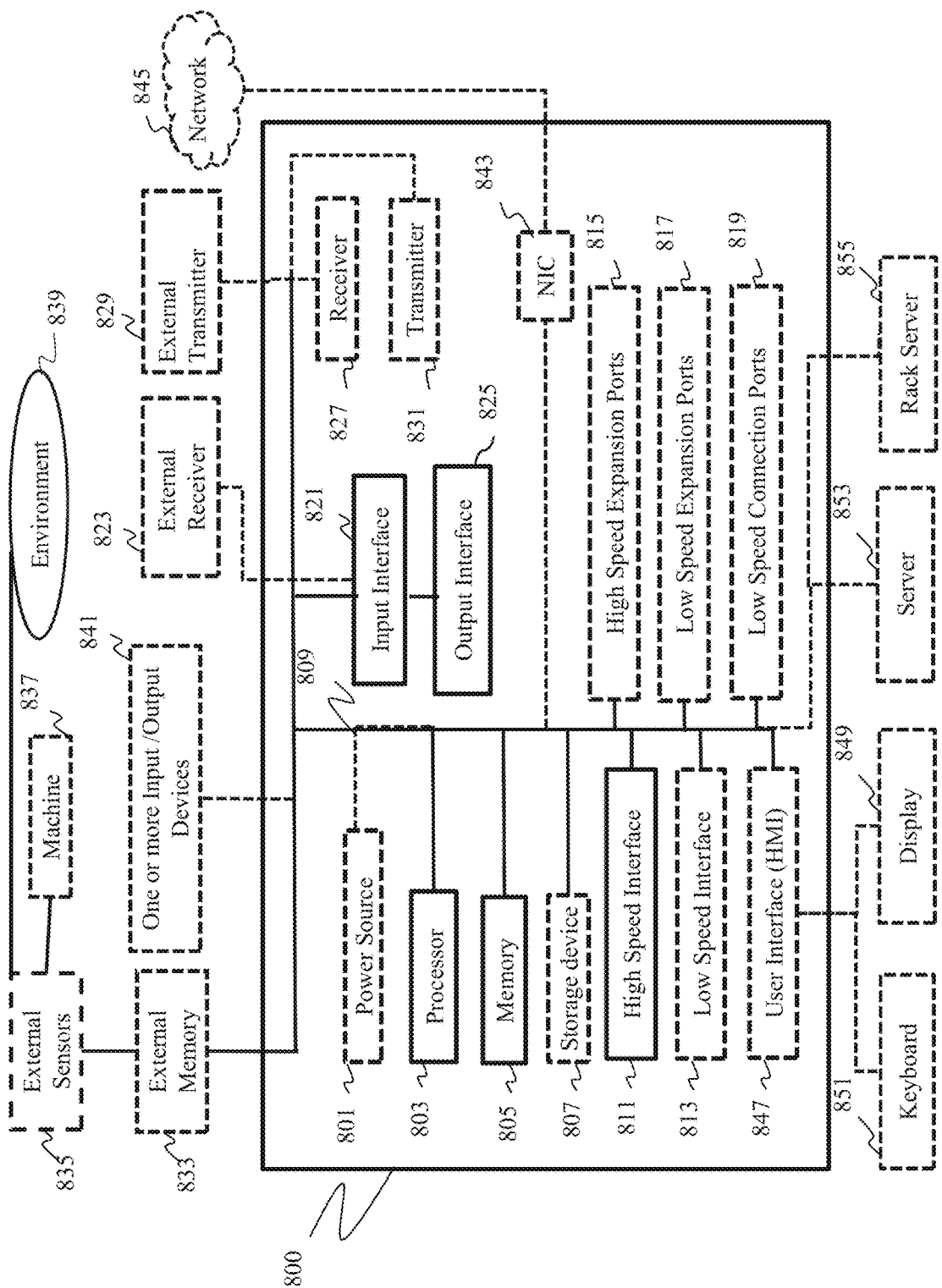
FIG. 8 is a schematic illustrating a computing device for implementing the methods and systems/controllers of the present disclosure.

FIG. 8 is a schematic illustrating a computing device 800 for implementing the methods and systems/controllers of the present disclosure. The computing device 800 includes a power source 801, a processor 803, a memory 805, a storage device 807, all connected to a bus 809. Further, a high-speed interface 811, a low-speed interface 813, high-speed expansion ports 815 and low speed connection ports 817, can be connected to the bus 809. In addition, a low-speed expansion port 819 is in connection with the bus 809. Further, an input interface 821 can be connected via the bus 809 to an external receiver 823 and an output interface 825. A receiver 827 can be connected to an external transmitter 829 and a transmitter 831 via the bus 809. Also connected to the bus 809 can be an external memory 833, external sensors 835, machine(s) 837, and an environment 839. Further, one or more external input/output devices 841 can be connected to the bus 809. A network interface controller (NIC) 843 can be adapted to connect through the bus 809 to a network 845, wherein data or other data, among other things, can be rendered on a third-party display device, third party imaging device, and/or third-party printing device outside of the computing device 800.

The memory 805 can store instructions that are executable by the computing device 800 and any data that can be utilized by the methods and systems of the present disclosure. The memory 805 can include random access memory (RAM), read only memory (ROM), flash memory, or any other suitable memory systems. The memory 805 can be a volatile memory unit or units, and/or a non-volatile memory unit or units. The memory 805 may also be another form of computer-readable medium, such as a magnetic or optical disk.

The storage device 807 can be adapted to store supplementary data and/or software modules used by the computer device 800. The storage device 807 can include a hard drive, an optical drive, a thumb-drive, an array of drives, or any combinations thereof. Further, the storage device 807 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 803), perform one or more methods, such as those described above.

The computing device 800 can be linked through the bus 809, optionally, to a display interface or user Interface (HMI) 847 adapted to connect the computing device 800 to a display device 849 and a keyboard 851, wherein the display device 849 can include a computer monitor, camera, television, projector, or mobile device, among others. In some implementations, the computer device 800 may include a printer interface to connect to a printing device, wherein the printing device can include a liquid inkjet printer, solid ink printer, large-scale commercial printer, thermal printer, UV printer, or dye-sublimation printer, among others.

The high-speed interface 811 manages bandwidth-intensive operations for the computing device 800, while the low-speed interface 813 manages lower bandwidth-intensive operations. Such allocation of functions is an example only. In some implementations, the high-speed interface 811 can be coupled to the memory 805, the user interface (HMI) 848, and to the keyboard 851 and the display 849 (e.g., through a graphics processor or accelerator), and to the high-speed expansion ports 815, which may accept various expansion cards via the bus 809.

In an implementation, the low-speed interface 813 is coupled to the storage device 807 and the low-speed expansion ports 817, via the bus 809. The low-speed expansion ports 817, which may include various communication ports (e.g., USB, Bluetooth, Ethernet, wireless Ethernet) may be coupled to the one or more input/output devices 841. The computing device 800 may be connected to a server 853 and a rack server 855. The computing device 800 may be implemented in several different forms. For example, the computing device 800 may be implemented as part of the rack server 855.

The description provides exemplary embodiments only and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, using machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Further, embodiments of the present disclosure and the functional operations described in this specification can be implemented in digital electronic circuitry, in tangibly embodied computer software or firmware, in computer hardware, including the structures disclosed in this specification and their structural equivalents, or in combinations of one or more of them. Further, some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

Computers suitable for the execution of a computer program include, by way of example, can be based on general or special purpose microprocessors or both, and any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A controller for controlling a motion of a device subject to constraints on the motion of the device, the controller comprising: a processor; and a memory having instructions stored thereon that, when executed by the processor, cause the controller to:
collect a sequence of states of the device and a corresponding sequence of control inputs transitioning states in the sequence of states of the device according to a non-linear dynamics of the device, wherein each state and each control input are selected from a state-input space having dimensions defined by dimensions of the state and dimensions of the control input;
transform the states and the control inputs from the state-input space into a lifted space with dimensions higher than the dimensions of the state-input space to produce a sequence of lifted states transitioned according to a sequence of lifted control inputs;

determine a linear model of dynamics of the device in the lifted space approximating transitions of the lifted states according to the lifted control inputs by minimizing fitting errors between the lifted states and approximation of the lifted states according to the linear control law;

determine a modeling error as a function parameterized on the lifted states and the lifted control inputs bounding a data-driven envelope of a Lipschitz continuity on the fitting errors;

solve an optimal control problem in the lifted space over a prediction horizon optimizing the motion of the device according to the linear model subject to the constraints reformulated based on an evolution of the error model within the prediction horizon to produce a lifted next control input; and transform the lifted next control input into the state-input space to produce a next control input; and submit the next control input to an actuator of the device to change the state of the device.

2. The controller of claim 1, wherein the linear model of dynamics of the device is determined using Koopman-based modeling.

3. The controller of claim 1, wherein the function of the modeling error includes one or a combination of a regression model, a neural network, a Gaussian process, and a model based on reproducing kernel Hilbert spaces.

4. The controller of claim 1, wherein the function of the modeling error enforces statistical bounds on the data-driven envelope of the fitting errors.

5. The controller of claim 1, wherein the function of the modeling error enforces deterministic bounds on the data-driven envelope of the fitting errors.

6. The controller of claim 1, wherein the constraints in the state-input space are reformulated into the lifted space such that a solution of the optimal control problem in the lifted space satisfying the reformulated constraints is guaranteed to satisfy the constraints in the state-input space.

7. The controller of claim 1, wherein the reformulated constraints in the lifted space are complimented with additional constraints to enable recursive feasibility or stability of the controlling.

8. The controller of claim 1, wherein a sequence of control commands evaluated via the linear model of dynamics produces a surrogate trajectory of the device in the lifted space, and wherein the Lipschitz continuity on the fitting error is defined as hypercylinders with the predetermined radii that are related to the surrogate trajectory via a collection of convex constraints on the surrogate trajectory and the radii.

9. The controller of claim 1, wherein the transformations between the state-input space and the lifted space are predetermined nonlinear transformations.

10. The controller of claim 1, wherein the optimal control problem in the lifted space is a convex problem.

11. The controller of claim 1, wherein the device includes one or a combination of an autonomous vehicle, a mobile robot, an aerial drone, a ground vehicle, an aerial vehicle, a water surface vehicle, and an underwater vehicle.

12. The controller of claim 1, further configured to control the device using a model predictive control (MPC) over the prediction horizon, wherein the MPC includes solving the optimal control problem in the lifted space over the prediction horizon to produce a sequence of lifted control inputs; and transform at least an initial lifted control input in the sequence of lifted control inputs into the state-input space to produce the next control input.

13. The controller of claim 12, further configured to measure the state of the device changed by applying the next control input;

transform the measured state into the lifted state space; and update the linear model of dynamics of the device based on the initial lifted control input, a corresponding lifted state predicted for the initial lifted control input by the MPC, and the measured state transformed into the lifted state space.

14. A method for controlling a motion of a device subject to constraints on the motion of the device, wherein the method uses a processor coupled with stored instructions implementing the method, wherein the instructions, when executed by the processor carry out steps of the method, comprising:

collecting a sequence of states of the device and a corresponding sequence of control inputs transitioning states in the sequence of states of the device according to a non-linear dynamics of the device, wherein each state and each control input are selected from a state-input space having dimensions defined by dimensions of the state and dimensions of the control input;

transforming the states and the control inputs from the state-input space into a lifted space with dimensions higher than the dimensions of the state-input space to produce a sequence of lifted states transitioned according to a sequence of lifted control inputs;

determining a linear model of dynamics of the device in the lifted space approximating transitions of the lifted states according to the lifted control inputs by minimizing fitting errors between the lifted states and approximation of the lifted states according to the linear control law;

determining a modeling error as a function parameterized on the lifted states and the lifted control inputs bounding a data-driven envelope of a Lipschitz continuity on the fitting errors;

solving an optimal control problem in the lifted space over a prediction horizon optimizing the motion of the device according to the linear model subject to the constraints reformulated based on an evolution of the error model within the prediction horizon to produce a lifted next control input;

transforming the lifted next control input into the state-input space to produce a next control input; and submitting the next control input to an actuator of the device to change the state of the device.

15. A non-transitory computer-readable storage medium embodied thereon a program executable by a processor for performing a method for controlling a motion of a device subject to constraints on the motion of the device, the method comprising:

collecting a sequence of states of the device and a corresponding sequence of control inputs transitioning states in the sequence of states of the device according to a non-linear dynamics of the device, wherein each state and each control input are selected from a state-input space having dimensions defined by dimensions of the state and dimensions of the control input;

transforming the states and the control inputs from the state-input space into a lifted space with dimensions higher than the dimensions of the state-input space to produce a sequence of lifted states transitioned according to a sequence of lifted control inputs;

determining a linear model of dynamics of the device in the lifted space approximating transitions of the lifted states according to the lifted control inputs by minimizing fitting errors between the lifted states and approximation of the lifted states according to the linear control law;

determining a modeling error as a function parameterized on the lifted states and the lifted control inputs bounding a data-driven envelope of a Lipschitz continuity on the fitting errors;

solving an optimal control problem in the lifted space over a prediction horizon optimizing the motion of the device according to the linear model subject to the constraints reformulated based on an evolution of the error model within the prediction horizon to produce a lifted next control input;

transforming the lifted next control input into the state-input space to produce a next control input; and submitting the next control input to an actuator of the device to change the state of the device.

\* \* \* \* \*